United States Patent [19]

De Feo et al.

[11] Patent Number: 4,460,037

[45] Date of Patent: Jul. 17, 1984

[54] TUBE CONSTRUCTION FOR FLUIDIZED BED COMBUSTOR

[75] Inventors: Angelo De Feo, Totowa; William Hosek, Mt. Tabor, both of N.J.

[73] Assignee: Curtiss-Wright Corporation, N.J.

[21] Appl. No.: 226,688

[22] Filed: Jan. 21, 1981

Related U.S. Application Data

[62] Division of Ser. No. 81,935, Oct. 4, 1979, Pat. No. 4,290,387.

[51] Int. Cl.³ .............................. F28D 7/12; F28F 9/06
[52] U.S. Cl. ........................................ 165/76; 165/142; 165/178
[58] Field of Search .................... 165/142, 76, 78, 81, 165/82, 173, 175, 178

[56] References Cited

U.S. PATENT DOCUMENTS

| | | | |
|---|---|---|---|
| 1,054,926 | 3/1913 | Mantius | 165/142 |
| 1,758,582 | 5/1930 | Mott | 165/142 |
| 1,967,706 | 7/1934 | Carroll | 165/142 |
| 2,134,058 | 10/1938 | Ris | 165/142 |
| 2,225,634 | 12/1940 | Houdry | 165/142 |
| 2,280,089 | 4/1942 | Houdry | 165/142 |
| 2,665,556 | 1/1954 | Otten | 165/142 |
| 4,151,874 | 5/1979 | Kaburagi et al. | 165/142 |
| 4,330,031 | 5/1982 | Shefsiek | 165/142 |

FOREIGN PATENT DOCUMENTS

763540 5/1934 France ............................ 165/142

*Primary Examiner*—Sheldon J. Richter
*Attorney, Agent, or Firm*—McGlew and Tuttle

[57] ABSTRACT

A fluidized bed combustor comprises a reactor or a housing which has a windbox distributor plate adjacent the lower end thereof which contains a multiplicity of hole and air discharge nozzles for discharging air and coal into a fluidized bed which is maintained above the distributor plate and below a take-off connection or flue to a cyclone separator in which some of the products of combustion are treated to remove the dust which is returned into the fluidized bed. A windbox is spaced below the fluidized bed and it has a plurality of tubes passing therethrough with the passage of combustion air and fluidizing air which passes through an air space so that fluidizing air is discharged into the reaction chamber fluidized bed at the bottom thereof to maintain the bed in a fluidized condition. A fluid, such as air, is passed through the tubes which extend through the windbox and provide a preheating of the combustion air and into an annular space between telescoped inner and outer tubes which comprise heat exchanger tubes or cooling tubes which extend upwardly through the distributor plate into the fluidized bed. The heat exchanger tubes are advantageously arranged so that they may be exposed in groups within the reactor in a cluster which is arranged within holding rings.

11 Claims, 11 Drawing Figures

TUBE CONSTRUCTION FOR FLUIDIZED BED COMBUSTOR

The Government has rights in this invention pursuant to Contract No. EX-76-C-01-1726 awarded by the U.S. Energy Research and Development Administration.

This is a division of application Ser. No. 081,935 filed Oct. 4, 1979, now issued as U.S. Pat. No. 4,290,387 issued Sept. 22, 1981.

FIELD AND BACKGROUND OF THE INVENTION

This invention relates, in general, to fluidized bed combustion and, in particular, to a new and useful pressurized fluidized bed combustor, which includes a reaction chamber having a multiplicity of vertically extending cooling tubes arranged therein and to an improved construction of the cooling tubes and a cluster arrangement of such cooling tubes.

Many types of fluidized bed combustors are known. In addition, combustors are known in which the fluidized bed combustor is operated at an elevated pressure and a fluid, such as compressed air, is employed for effecting the pressurization of the reaction chamber. It is known in such reactors to provide a bed of particulate matter including coal which may be blown into the reactor chamber, for example, by nozzles which also provide a combining of the coal with combustion air. Initial firing of such reactors is sometimes carried out by gas burners or by one or more oil burners in addition to coal fire burners. It is known to use such reactors for carrying out various drying, heating and heat transferring operations in which a fluid, such as air or water is usually employed to cool the fluidized bed and to transfer heat into the working fluid for other uses, such as for driving a turbine. Many types of reactor constructions are known which include cooling or heat exchanger tubes which are arranged either vertically or horizontally, both in the fluidized bed and above the fluidized bed. In many instances, the high temperatures prevalent in the bed lead to the clogging of the space between the heat exchanger tubes as well as deterioration or wearing out of the tubes so that they must be replaced or repaired. In the known construction, the tubes must usually be separately removed and replaced after the reactor is shut down.

SUMMARY OF THE INVENTION

The present invention relates to an improved pressurized fluidized bed reactor, particularly for use in preheating a fluid such as air for use in a turbine wherein the heat exchanger tubes are of special construction and are advantageously arranged in clusters so that they may be easily removed when necessary. In accordance with the invention, the tubes are arranged substantially vertically and include an inner tube arranged within an outer tube preferably made of double-wall construction having insulation between the walls and provided with a cap at its other end to close off the two tubes. The outer tube is advantageously radially spaced outwrdly from the inner tubes so as to define an upward flow space for the fluid which is to be circulated and the top thereof is provided with a tube cap so that the air is deflected back downwardly through the center tube and discharged out of the reactor at the lower end thereof.

In a preferred arrangement of the invention, the outer tube is constructed with a cap or trunnion portion which extends upwardly and may be engaged within an opening of a holder member and held therein by a cross key which is provided above the holder member and extends through an opening of the cap trunnion. The trunnion also carries a shackle at the top and so that the tube itself may be handled by lifting equipment. In addition, when the tube is assembled to a holding member, the whole group of tubes are supported together adjacent their top ends in the reactor. The inner double wall tube extends through tubular insulation elements which are mounted to extend through the support wall at the lower end of the fluidized bed combustor. The tubular insulation elements comprise hollow tubular members containing insulation and include a lower one having an upwardly and outwardly flaring conical end face which engages against a downwardly and inwardly conical end face of an upper tubular insulation portion. The two tubular insulation elements are welded together to permit some migration therebetween and they permit the mounting of the inner tube of the double wall tube construction in the wall structure so that relative expansion and contraction of the parts is possible. The outer tube which surrounds the inner tube is fitted with an adapter which has a stepped portion which engages on a shoulder formed in a windbox distributor plate The adapter includes a stepped portion or shoulder located above the bottom step so as to space the upper portion of the adapter inwardly from the tubular element of the distributor plate or windbox connecting tube, so that the space may be lined with insulation.

Accordingly, it is an object of the invention to provide an improved pressurized fluidized bed reactor which includes vertically extending heat exchanger tubes which are mounted in the reactor so as to extend upwardly in the fluidized bed and which comprise an inner tube which is connected at its lower end through the bottom of the reactor for the discharge of a cooling fluid and an annular tube in which the inner tube is positioned and which defines flow space between the tubes for the upflow of the fluid which is to be heated in the reactor and which is capped at its upper end so that the fluid flows back downwardly through the inner tube and which also advantageously includes a cap portion having means for supporting the top of the tube in the reactor.

A further object of the invention is to provide a fluidized bed combustor which includes a housing having a distributor plate adjacent the lower end thereof above which a fluidized bed is maintained and which has openings therethrough for the passage of a plurality of vertically extending cooling tubes and also has a passage for nozzles for directing coal and air into the reactor chamber and wherein the cooling tubes are connected with an adapter which positions them in respect to the distributor plate and also with the lower end having a fitting which forms a conical downwardly extending member which fits into but is not supported by a conical receiving portion of a supporting plate defined at the lower end of the reactor. Below the supporting plate the reactor includes a plenum chamber for the air which is heated in the reactor bed which is delivered outwardly from the reactor for use, for example, in a gas turbine. The lower ends of the tubes are supported in the plenum chamber and partly by a lower interior wall of the reactor.

A further object of the invention is to provide a tube cluster arrangement particularly for a fluidized bed combustor which comprises a group of tube assemblies, each tube assembly including outer and inner tubes defining outer annular and inner tubular flow passages for a cooling fluid, and which includes a supporting member, preferably in the form of a ring, having openings for the passage of a cap of each tube which may be secured to the supporting member by a cross piece and wherein the tubes may be handled in the cluster by engagement of shackle at the top of each tube assembly, A further object of the invention is to provide a combustor and a tube construction and arrangement therefor which are simple in design, rugged in construction and economical to manufacture.

For an understanding of the principles of the invention, reference is made to the following description of typical embodiments thereof as illustrated in the accompanying drawings.

DETAILED DESCRIPTION OF THE PREFERRED EMBODIMENTS

Figure 1:
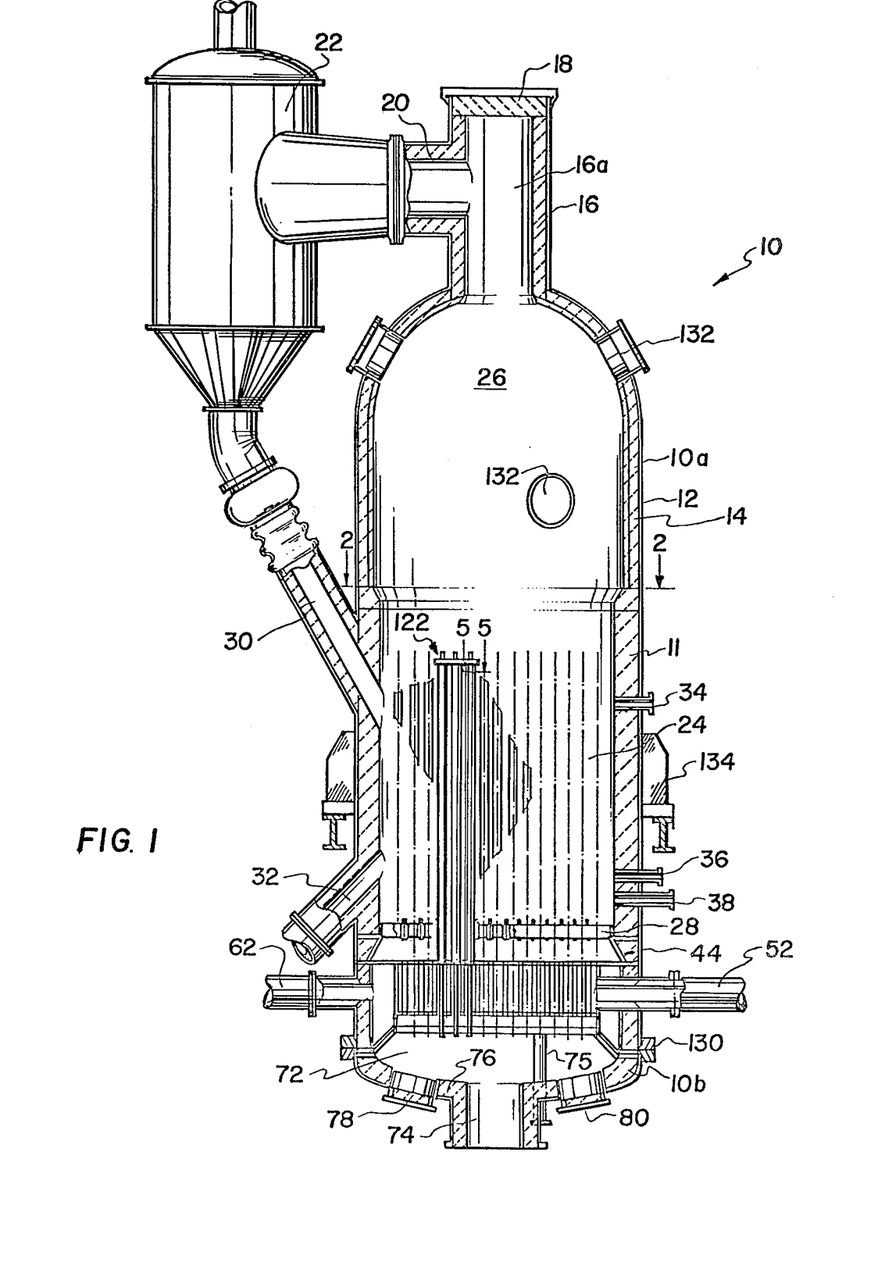
FIG. 1 is a vertical elevational view partially in section of a fluidized bed combustor constructed in accordance with the invention.
Figure 2:
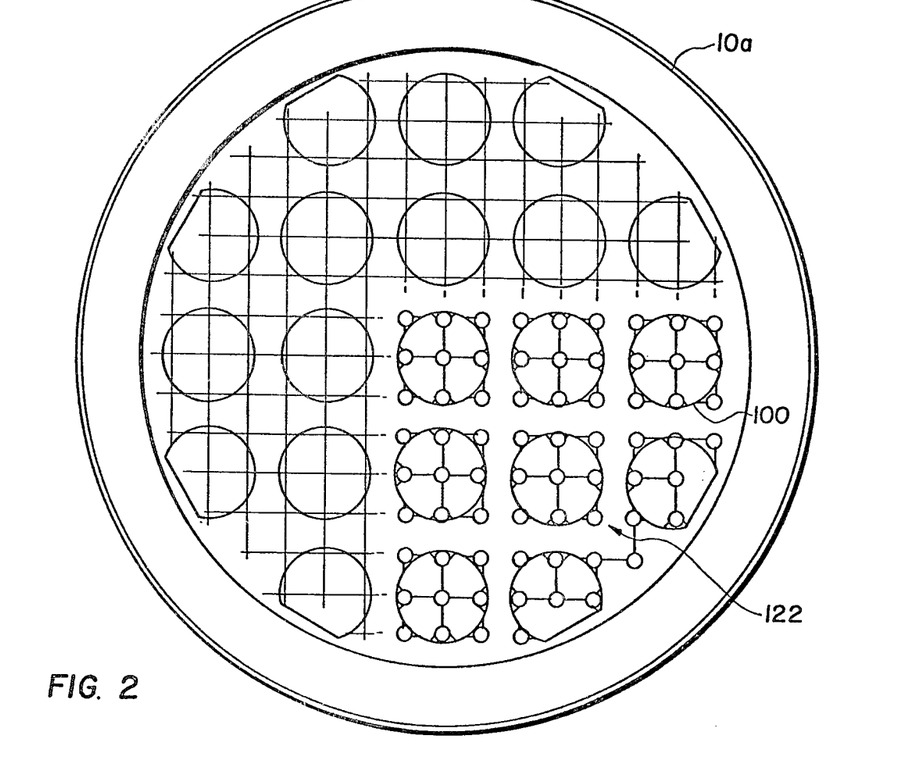
FIG. 2 is a section taken along the line 2—2 of FIG. 1, but on a slightly enlarged scale.

Referring to the drawings, in particular, the invention embodied therein comprises a combustor, particularly a pressurized fluidized bed combustor generally designated 10 which comprises a housing 11 which has an outer metal wall 12 and an inner wall made of an insulating material such as refractory 14. The upper portion of the housing 11 is provided with a flue off-take 16 having a vertical portion 16a which is covered by a removable cap 18 and a horizontal or cross-portion 20 which is directed tangentially into a dust separator 22. A fluidized bed section 24 is maintained in a reaction chamber 26 at the lower end thereof above a distributor plate 28. Gaseous products of combustion which are generated in the reactor chamber 26 move off through the flue off-take 16 and into the separator 22 and a portion of the dust which is recovered is returned through a dust return 30 back to the fluidized bed 24. Spent ashes which are accumulated in the fluidized bed 24 are removed through an ash discharge 32 which connects into the reactor chamber 26 at the lower end thereof. A side wall of the reactor also provides a mounting for an absorbent gun 34 for directing an absorbent material into the fluidized bed 24. In addition, an oil gun 36 and an auxiliary coal feed gun 38 are provided in the side wall to provide a support for combustion during the initial stages of operation of the device.

Figure 3:
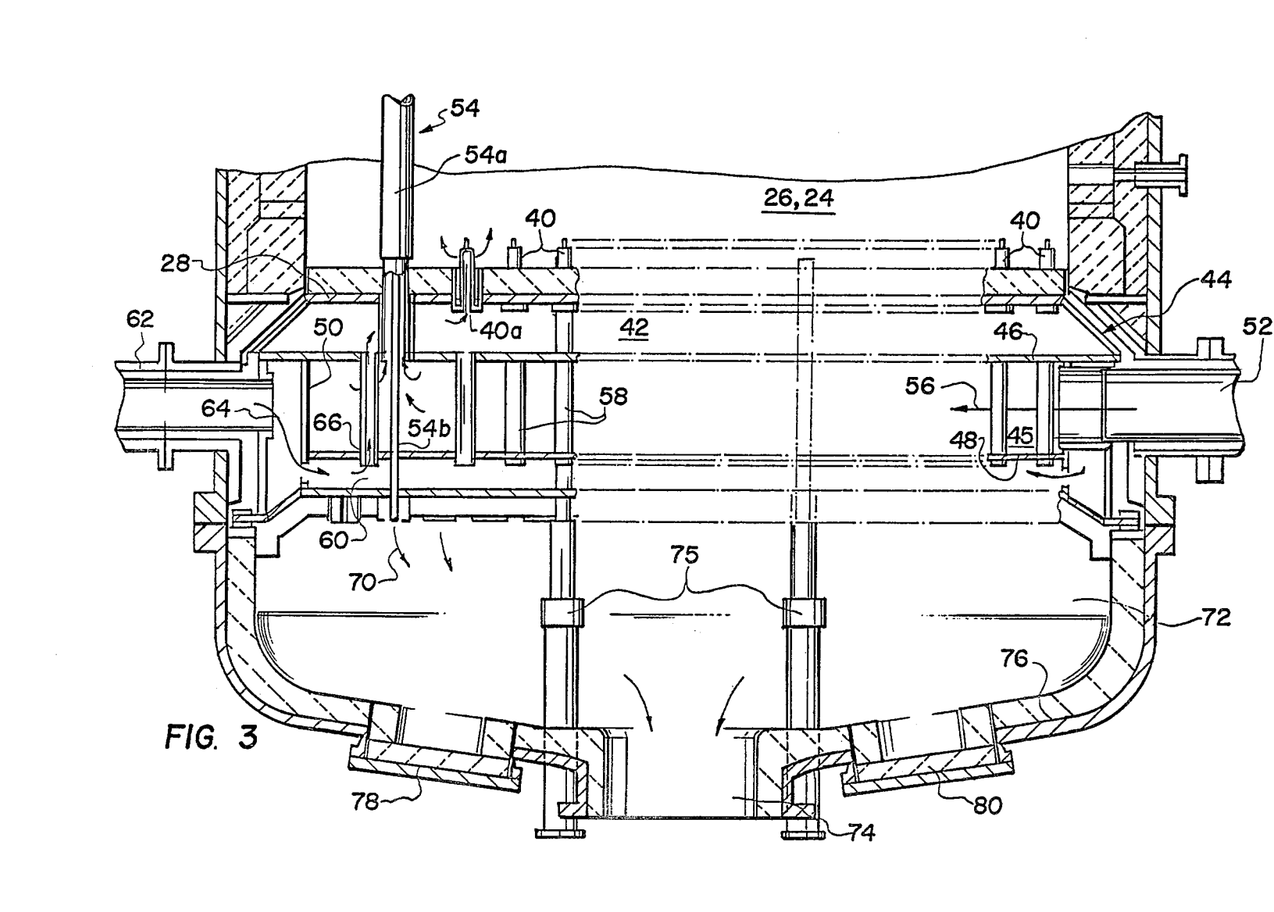
FIG. 3 is an enlarged detail view of the distributor supporting plate and windbox for the combustor shown in FIG. 1.

The distributor plate 28 provides a mounting, as best seen in FIG. 3, for individual tuyeres or air nozzles 40 having inlets 40a at their lower ends which communicate with the combustion air in windbox 42 defined between the distributor plate 28 and a heat exchanger inlet plenum and a windbox assembly generally designated 44. The windbox assembly 44 includes a heat exchanger inlet plenum 45 including top walls 46, bottom wall 48 and a side wall 50. A circulating fluid inlet 52 connects into the wall 50 of the inlet plenum 45 to provide for flow of a fluid which will provide for cooling of heat exchanger tubes, generally designated 54 which are also referred to as fluidized bed regulating or cooling tubes. The circulating fluid is admitted in the direction of arrow 56 shown in FIG. 3 and it flows around tubes 58 which extend through the windbox and which provide for passage of combustion air therethrough from an air chamber or lower section chamber 60 fed by a fluidizing or combustion air inlet pipe 62. The air passes through the tubes 58 into the air chamber or windbox 42. The combustion air flows in the direction of the arrow 64 into the air chamber 60 and from the air chamber in the direction of the arrow 66 through the tubes 58 and into the chamber 42. The coal, which has been reduced to a small size, is delivered through a coal gun 75 into the chamber 26 and the air is delivered through the inlet 40a of the tuyeres 40 for discharge into the fluidized bed above the distributor plate 28.

In accordance with a feature of the invention, the heat exchanger tubes 54 comprise an outer tube 54a which extends through the distributor plate 28 and is supported in windbox 42 and an inner tube 54b which is supported in a bottom support member 68 which is disposed above the bottom wall 76 of the reactor housing 11. Below the member 68, the inner tubes 54b discharge in the direction of arrows 70 (FIG. 3) into a heated fluid chamber 72 which communicates with a heated fluid discharge 74 which may, for example, be connected to a gas turbine (not shown). The housing includes a bottom wall 76 having one or more manhole openings 78 and 80 for access to the interior of the housing 11.

Figure 5:
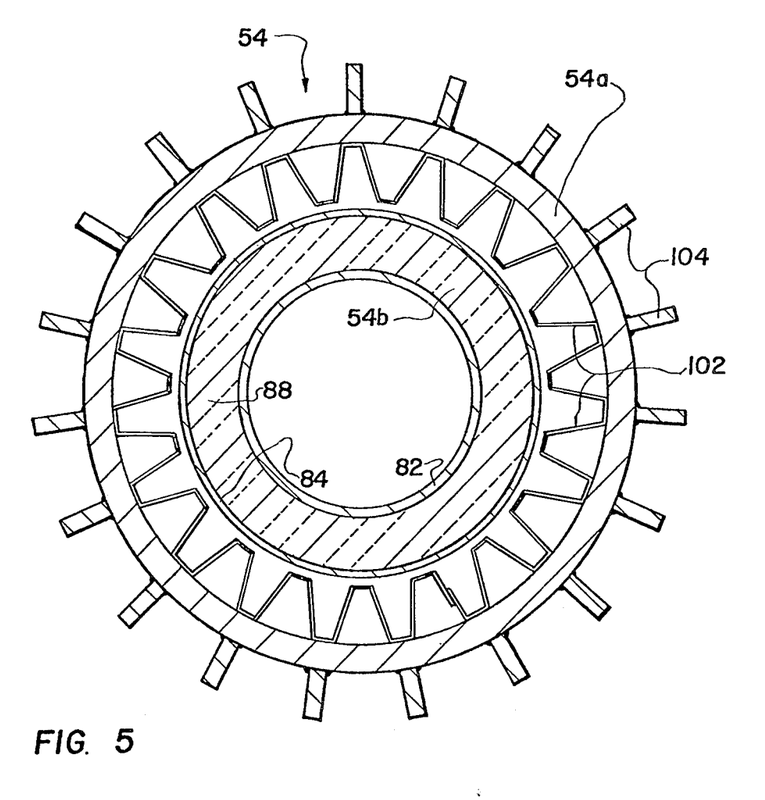
FIG. 5 is an enlarged sectional view taken along the lines 5—5 of FIG. 1.
Figure 6A:
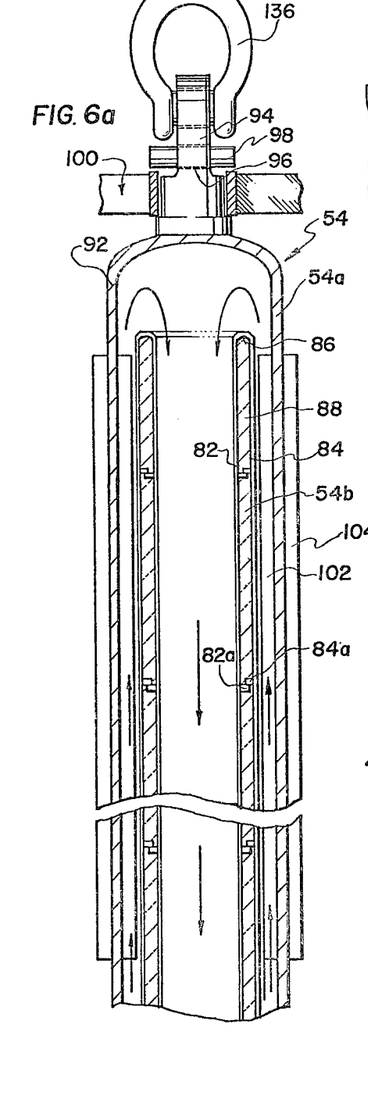
FIG. 6a is an enlarged vertical sectional view of the upper portion of the heat exchanger tube for the combustor shown in FIG. 1.
Figure 6B:
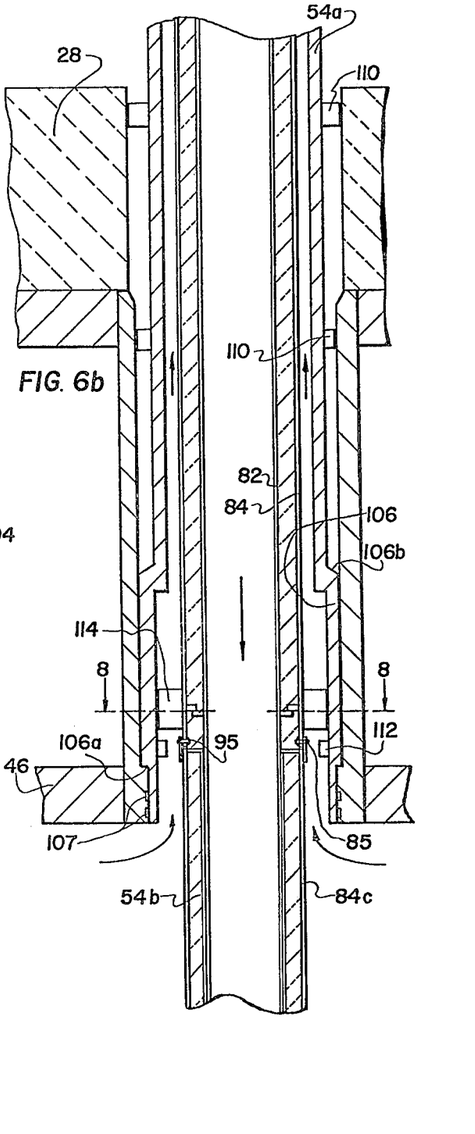
FIG. 6b is a view similar to FIG. 6a of an intermediate portion of the heat exchanger tube.

Referring to FIG. 6a, it can be seen that the inner tube 54b is made up of two tubular wall portions 82 and 84 and the tops of these wall portions are provided with machined cap 86 and the space between the tubular wall portions is filled with sections 88 of an insulation material. The projections 82a and 84a, which extend outwardly from the respective facing surfaces thereof, support the sections of insulation 88. The lower ends of the inner tube 54b is supported in position at the member 68 (FIG. 6c) and extend below the lower end of the outer tube 54a. The inner tube 82 of inner tube assembly 54b is welded to a section 90 as shown in FIG. 8c at the lower end thereof. The outer tube 54a at its upper end portion is provided with a pipe cap 92 having a trunnion extension 94 with an opening 96 therethrough through which a pintel or securing pin 98 is directed for the purpose of holding the tube assembly 54 in position on a support member generally designated 100. The overall length of the heat exchanger tube 54 is around 20 feet and the outer pipe 54a is provided with both interior and exterior fins 102 and 104, respectively, and it extends about 16 feet above the distributor plate 28. The outer pipe 54a is fabricated in two lengths and welded together and the fins of each length are aligned. In the embodiment, as shown in FIG. 5, there are 19 fins 104 brazed on the outside of the pipe and the fins are around 1/10 inch thick and 0.40 inch high. Fins 102 on the inside, are convoluted fins which are also brazed in place. This provided 38 radial legs that are 0.015 inches thick and one-half inch high at the apex of each convolution of the inner fins is located to be aligned with every fin on the outside of the tube. As shown in FIG. 6b, the lower end of the outside tube 54a is welded to an adapter 106 that supports the outer tube in a tubular receiving socket 108 of the distributor plate 28. A ring 110 is welded to the outside of the exterior tube 54 and it provides an increased length of support for the heat exchanger tube. A second ring 110 is also welded to the outside of the outer tube 54a and located approximately in line with the top of the distributor plate 28. The area between the rings and over the adapter 106, about 106b, is filled with a layer of insulation which is spirally wound around the outer pipe 54a. This precludes entry of ash into the mounting area of the tubes.

The adapter 106 provides three functions: first, it has a step 106a that supports the adapter 106 and the exterior tube 54a in the receiving tube or socket 108. Second, it has an internal ring 112 that provides means for capturing the inner insulated tube 54b which has outer fins 114 which will not pass by the ring 112. This makes it possible to handle the inner and outer tubes as an assembly 54. In addition, adequate clearance is provided for thermal dimension changes. Third, the lower end of the adapter 106 lies within the range of the plate 46 of the windbox. This lower end is mechanically rolled radially outwardly into the shallow grooves 107 to provide a seal. The construction permits an on-site assembly of the tubes. This is necessary so that the tubes may be replaced during the life of the pressurized fluidized bed combustor. The adapter 106 may be cut away in order to remove the tubes easily and a hydraulic tube puller may be provided to remove the remaining tube end.

Figure 6C:
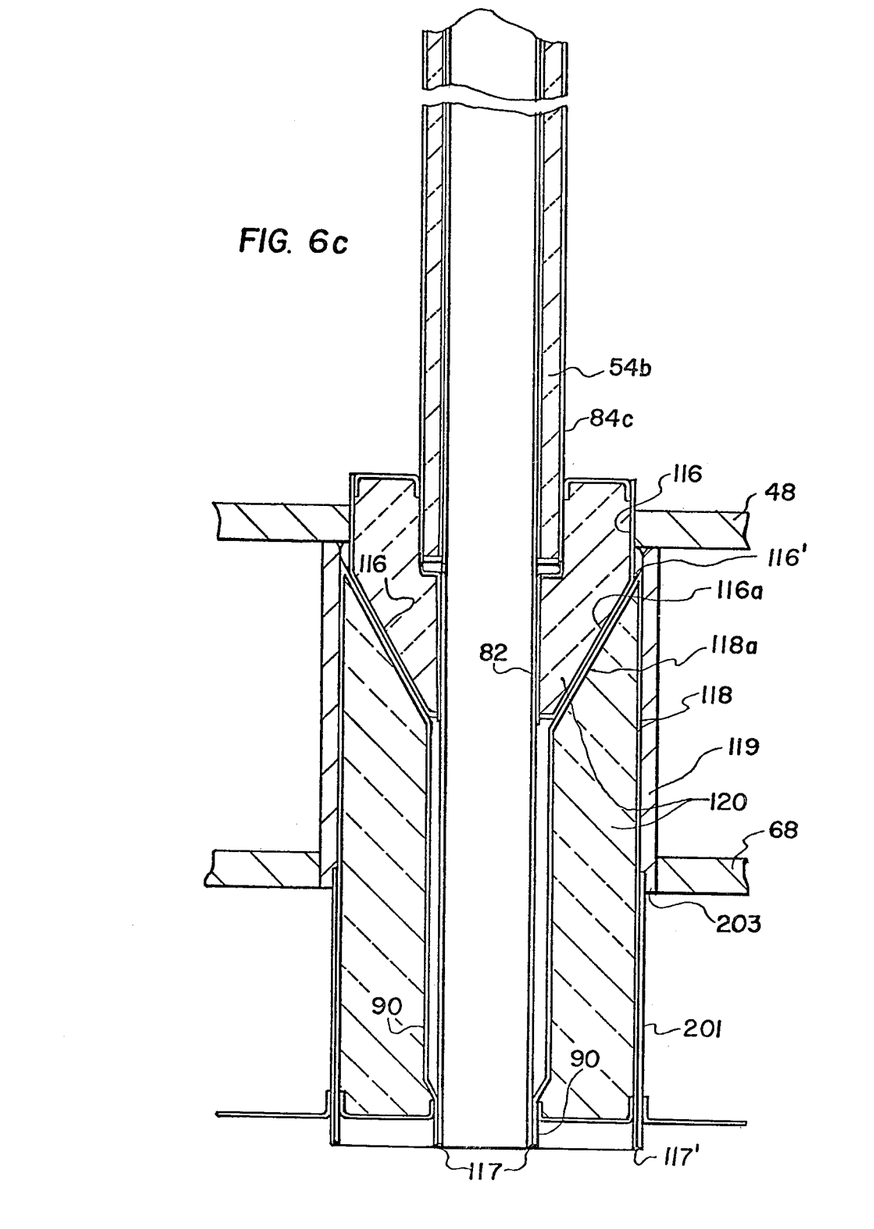
FIG. 6c is a view similar to FIG. 6a of the lower portion of the tube.
Figures 7, 8, 9:
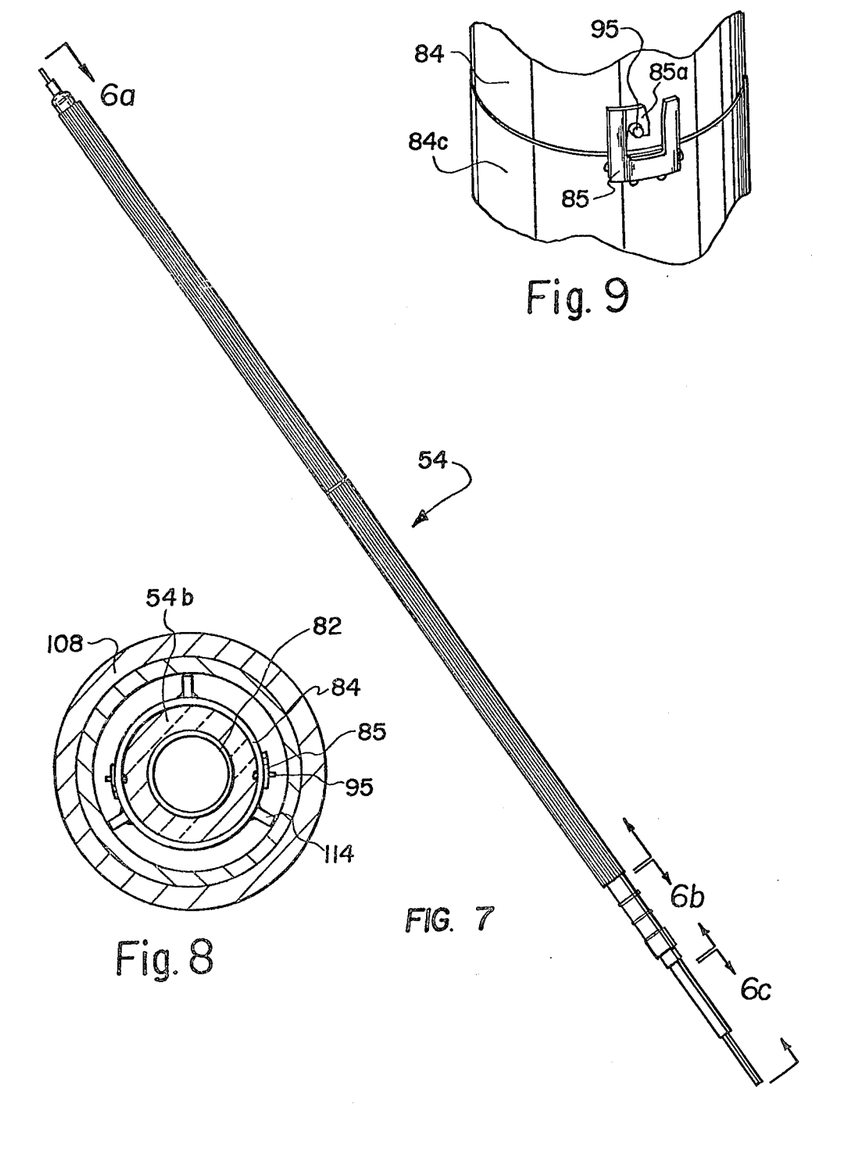
FIG. 7 is an elevational view of a single heat exchanger tube used in the combustor of FIG. 1.
FIG. 8 is a section taken along the line 8—8 of FIG. 6b.
FIG. 9 is a partial perspective view of a support fitting in accordance with the present invention.

As seen in FIG. 6c, the lower end of the inner tube 82 is welded and supported at 117 to tube 90 which in turn is welded at 117' and supported from an extension 201. The extension 201 is welded at 203 to the sleeve 119 and is attached to a conical socket member 118. The conical socket member 118 has a conical end face 118a which abuts against a conical end face 116 of an inwardly conically formed member or section 116. The two conical members 116 and 118 are tack welded together at several points around their periphery by tack welds indicated at 116'. The conical interconnection provides for a gradual change in the thermal stresses between the hot inner part 82 of the inner tube 54b and the cooler outer support tube 118. Both of the conical sections 116 and 118 contain insulation 120 which is disposed around the inner tube 82 in order to prevent any cooling air loss into the incoming cooling air. As best seen in FIGS. 6b, 7, 8 and 9 the outer tube portion 84 of the inner tube 54b carries the spaces 114 which are arranged, for example, at three equally spaced locations around its periphery and these are engaged by the ring 112. The lower end of adapter 106 may either be cut away or loosened from its connection with the sleeve 108. The casing 84a may be removed from the outer tube portion 84 by lifting the casing 84a to cause a hook shaped portion 85a of the support fitting 85 to clear a pin 95 which is welded or otherwise secured to the outer tube portion 84.

In accordance with a method of the invention the heat exchanger tube assemblies 54 may be disconnected from the assembly 44 by grinding off the welds 117 and 117' holding the inner tube portion 82 of the inner tube 54b and after the casings 84a, 118 and 116 are removed from the lower end and the adapter 106 is cut away from the tube assembly 54, permitting its removal the whole assembly may be lifted upwardly and outwardly of the assembly 44.

Figure 4:
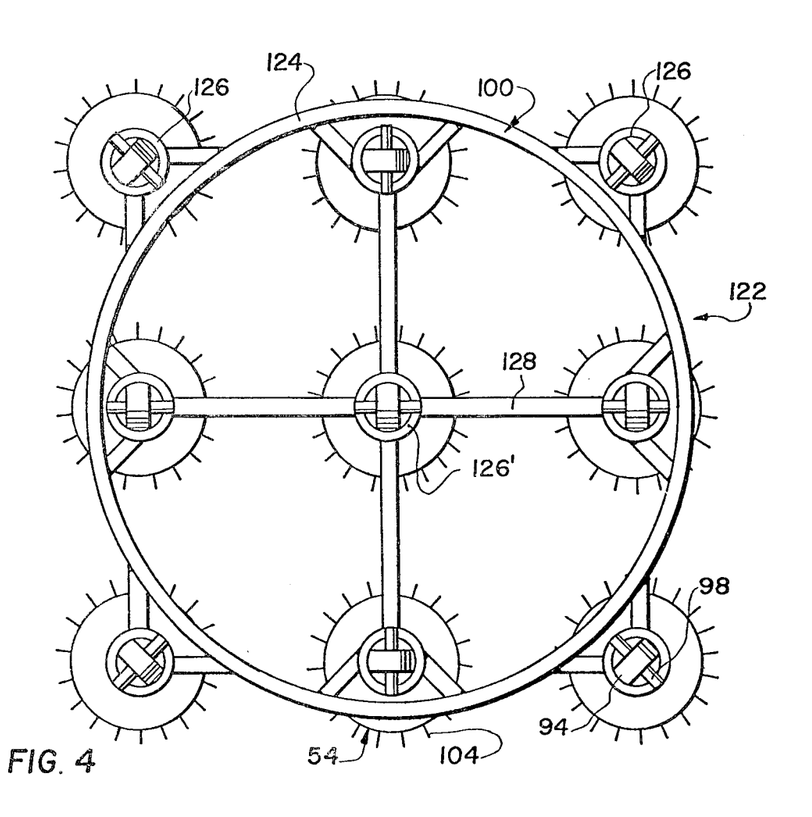
FIG. 4 is a top plan view of a cluster of heat exchanger pipes for the combustor shown in FIG. 1.

Referring to FIGS. 1 and 4, the tubes 54 are arranged in groups or clusters, generally designated 122 in which they are supported at their upper ends by the support member or ring structure generally designated 100. The ring structure 100 includes an outer ring portion 124 which is connected to individual support collars 126 which are arranged in a rectangular pattern around the circumference of the ring and which, in the embodiment shown in FIG. 4 comprise eight separate support collars 126 around the periphery of the ring 124 and one support collar 126' at the center thereof. The ring structure is reinforced and the outer ring 124 is supported by radially extending arm portions 128 which extend between the center collar 126' and the outer collars 126. The trunnions 94 of each of the tube assemblies are passed upwardly through the rings 126 and 126' and they are supported on the ring structure 100 by individual pins or pintels 98 as indicated in FIG. 6a. The circular ring 100 passes within equal distance to the eight outer collars 126. The pin 98 is locked in place by a tack weld to the trunnion 94.

The fluid bed combustor housing 10 advantageously comprises an upper and lower shell portion which are fitted together at a separation line 130 and they may be secured together such as by clamping or bolting means (not shown). In addition, the upper vessel has four manways 132, only three of which are shown, so that the interior of the vessel is readily accessible. A support 134 for the housing 10 is advantageously connected to the upper section 10a so that the lower shell may be lowered for exposing the heat exchanger tubes 54 and the vessel lining for repairs.

The heat exchanger tube assembly 54 may be removed individually from the interior of the housing 10 without disturbing adjacent tubes. When it is determined that a tube or tubes must be replaced, a combustor is shut down and the tubes to be removed are located. When a major portion of the tubes must be replaced, the lower vessel may be lowered exposing all of the tubes. However, if only a few of the tubes need replacing, this may be accomplished by using manways in the upper and lower parts 10a and 10b of the housing. From the upper portion 10a of the combustor, ash, coal and an additional particulate matter in the bed, such as dolomite, may be removed from the area surrounding the tubes. The upper circular tube support rings 100 are removed by grinding off the tack welds of the retaining pins 98 and lifting off the support rings if so desired.

Since a shackle 136 may be attached to each of the trunnions 94, the individual tube assemblies may be lifted by hoisting equipment if so desired. For a complete tube removal, a support structure illustrated in FIG. 6c for the lower end of the tubes are advantageously cut off to allow the support assembly and the insulation surrounding the inner heat exchanger tube 54b to be removed. This provides access to the outer heat exchanger support. A special power-driven cutting tool is installed around the inner tube portion 82 and the outer tube adapter 106 is cut just above the area where the outer tube is sealed to the windbox. When this is done, a cable may be attached to the shackle 136 to lift the tube assembly out of the fluidized bed combustor.

Thus, the invention provides a pressurized fluid bed reactor having substantially vertically arranged heat exchanger tubes which are easily accessible for cleaning and/or removal, either singly or in clusters. In addition, the construction provides for a desired cooling air or fluid flow between inner and outer tubes of each tube assembly and downwardly through the inner tube and out of the reactor after the bed has been cooled or the fluid heated for use in other apparatus. The housing of the vessel is constructed with the support of an upper shell so that a lower shell may be removed there with the tubes and to expose the fluidized bed area. In addition, both housing parts include many manhole access openings for easy inspection and removal of tubes or other fittings.

While specific embodiments of the invention have been shown and described in detail to illustrate the application of the principles of the invention, it will be understood that the invention may be embodied otherwise without departing from such principles.

What is claimed is:

1. A tube construction for a fluidized bed reactor comprising an outer tube, an inner tube disposed within and spaced radially inwardly of said outer tube, an outer tube cap closing off the top of said outer tube and spaced from the top of said inner tube, the bottom of said outer tube being connectable to a fluid for the passage of fluid in the space between said outer and inner tubes to the top of said inner tube and then downwardly through said inner tube for discharge at the bottom thereof, an adapter tube welded to the lower end of said outer tube, an engagement step formed on the exterior of said adapter, a receiving tubular socket for mounting said adapter having a receiving step engageable with said engagement step and supporting said outer tube in said adapter, an interiorly extending member on said adapter adjacent the lower end thereof, and a capture protuberance secured to the exterior of said inner tube, said inner tube with said capture protuberance being captured above said interiorly extending member within said outer tube.

2. A tube construction for a fluidized bed reactor, comprising an outer tube, an inner tube disposed within and spaced radially inwardly of said outer tube, an outer tube cap closing off the top of said outer tube and spaced from the top of said inner tube, the bottom of said outer tube being connectable to a fluid for the passage of fluid in the space between said outer and inner tubes to the top of said inner tube and then downwardly through said inner tube for discharge at the bottom thereof, a cluster ring having a support collar thereon, said outer tube cap having a trunnion extension thereon with an opening therethrough, said extension being positionable through said collar with the opening located above said collar and a pintle extending through said opening for holding said tube construction on said support ring.

3. A tube construction according to claim 2, wherein said cluster ring is adapted to be freestanding in a fluidized bed reactor without connection to walls of the fluidized bed reactor.

4. A tube construction for the fluid bed reactor comprising an outer tube, an inner tube disposed within and spaced radially inwardly of said outer tube, an outer tube cap closing off the top of said outer tube and spaced from the top of said inner tube, the bottom of said outer tube being connectable to a fluid for the passage of fluid in the space between said outer and inner tubes to the top of said inner tube and then downwardly through said inner tube for discharge at the bottom thereof, a trunnion connected to said tube cap and extending upwardly therefrom, and a lifting shackle connected to said trunnion.

5. A tube construction according to claim 4, wherein said inner tube is of double wall construction and has insulation between said double wall.

6. A tube construction according to claim 4, including a plurality of fins connected both to the interior and exterior of said outer tube located at spaced locations around the periphery thereof.

7. A tube construction for the fluid bed reactor comprising an outer tube, an inner tube disposed within and spaced radially inwardly of said outer tube, an outer tube cap closing off the top of said outer tube and spaced from the top of said inner tube, the bottom of said outer tube being connectable to a fluid for the passage of fluid in the space between said outer and inner tubes to the top of said inner tube and then downwardly through said inner tube for discharge at the bottom thereof, a trunnion formed on the top of said cap having an opening therethrough, and a locking pin extending through the opening of said trunnion and adapted to lock the tube assembly over a support member.

8. A tube construction according to claim 7, wherein said inner tube is of double wall construction and has insulation between said double wall.

9. A tube construction according to claim 7 including a plurality of fins connected both to the interior and exterior of said outer tube located at spaced locations around the periphery thereof.

10. A tube construction for the fluid bed reactor comprising an outer tube, an inner tube disposed within and spaced radially inwardly of said outer tube, an outer tube cap closing off the top of said outer tube and spaced from the top of said inner tube, the bottom of said outer tube being connectable to a fluid for the passage of fluid in the space between said outer and inner tubes to the top of said inner tube and then downwardly through said inner tube for discharge at the bottom thereof, a free standing support member having a plurality of openings each adapted to receive a trunnion therethrough, a trunnion connected to said tube cap, and locking means for locking said trunnion to said support member.

11. A tube construction according to claim 10, wherein said support member comprises a ring, a plurality of collars carried by said ring around the periphery thereof, said tube cap including a trunnion portion engageable in a respective collar and having an opening therethrough which is positionable above the top of said collar, a locking pin engageable through the opening and resting on said collar to hold said trunnion to said collar.

* * * * *